(12) United States Patent
Huang et al.

(10) Patent No.: US 10,778,316 B2
(45) Date of Patent: Sep. 15, 2020

(54) HYBRID CLOSED-LOOP AND OPEN-LOOP MULTIPLE-INPUT MULTIPLE-OUTPUT SCHEME IN NEW RADIO

(71) Applicant: QUALCOMM Incorporated, San Diego, CA (US)

(72) Inventors: Yi Huang, San Diego, CA (US); Gokul Sridharan, San Diego, CA (US); Jay Kumar Sundararajan, San Diego, CA (US); Joseph Binamira Soriaga, San Diego, CA (US); Tingfang Ji, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/374,387

(22) Filed: Apr. 3, 2019

(65) Prior Publication Data
US 2019/0312624 A1 Oct. 10, 2019

Related U.S. Application Data

(60) Provisional application No. 62/653,233, filed on Apr. 5, 2018.

(51) Int. Cl.
*H04B 7/06* (2006.01)
*H04B 7/0456* (2017.01)

(52) U.S. Cl.
CPC ......... *H04B 7/0689* (2013.01); *H04B 7/0456* (2013.01); *H04B 7/0669* (2013.01); *H04B 7/0617* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,999,073 | B2* | 6/2018 | Nammi | H04W 74/006 |
| 2011/0085537 | A1* | 4/2011 | Tsai | H04B 7/0619 370/342 |
| 2013/0058386 | A1* | 3/2013 | Mazzarese | H04B 7/063 375/219 |
| 2013/0077708 | A1* | 3/2013 | Sorrells | H04B 1/0483 375/295 |
| 2013/0259147 | A1* | 10/2013 | Wang | H04L 1/0026 375/260 |
| 2014/0098689 | A1* | 4/2014 | Lee | H04B 7/0469 370/252 |
| 2015/0288431 | A1* | 10/2015 | Sorrells | H01Q 3/267 375/295 |
| 2016/0359507 | A1* | 12/2016 | Gerdin | H04W 52/42 |

(Continued)

OTHER PUBLICATIONS

Ericsson: "Robust Transmission Scheme for PUSCH", 3GPP Draft; R1-1705887, 3rd Generation Partnership Project (3GPP Mobile Competence Centre; 650, Route Des Lucioles ; F-06921 Sophia-Antipolis Cedex ; France, vol. RAN WG1, No. Spokane; USA; Apr. 3, 2017-Apr. 7, 2017 Apr. 2, 2017 (Apr. 2, 2017), XP051243998, 5 Pages, Retrieved from the Internet: URL:http://www.3gpp.org/ftp/Meetings_3GPP_SYNC/RAN1/Docs/ [retrieved on Apr. 2, 2017], Section 2, 2.1.

(Continued)

*Primary Examiner* — Linda Wong
(74) *Attorney, Agent, or Firm* — Harrity & Harrity, LLP

(57) ABSTRACT

Various aspects of the present disclosure generally relate to wireless communication. In some aspects, a wireless communication device may apply an open-loop multiple-input multiple-output (MIMO) scheme among a plurality of antenna groups associated with a plurality of antennas, wherein phase coherence cannot be maintained between the plurality of antenna groups; and may apply a closed-loop MIMO scheme among antennas within each antenna group of the plurality of antenna groups, wherein phase coherence can be maintained between antennas included in each antenna group of the plurality of antenna groups. Numerous other aspects are provided.

30 Claims, 8 Drawing Sheets

(56) References Cited

U.S. PATENT DOCUMENTS

| | | | |
|---|---|---|---|
| 2017/0034806 A1* | 2/2017 | Shapira | H04B 1/0007 |
| 2018/0054244 A1* | 2/2018 | Kim | H04B 7/065 |
| 2019/0253876 A1* | 8/2019 | Sun | H04B 7/0697 |
| 2020/0067608 A1* | 2/2020 | Shim | H04B 17/14 |

OTHER PUBLICATIONS

Ericsson: "Robust Transmission Scheme for PUSCH", 3GPP Draft; R1-1714273 Robust PUSCH Transmission Scheme, 3rd Generation Partnership Project (3GPP), Mobile Competence Centre ; 650, Route Des Lucioles ; F-06921 Sophia-Antipolis Cedex ; France, vol. RAN WG1, No. Prague; Czech Republic; Aug. 21, 2017-Aug. 25, 2017, Aug. 20, 2017 (Aug. 20, 2017), XP051317069, 7 Pages, Retrieved from the Internet:URL:http://www.3gpp.org/ftp/Meeting_3GPP_Sync/RAN1/Docs/ [retrieved on Sep. 20, 2017], Section 2, 2.1.

International Search Report and Written Opinion—PCT/US2019/025864—ISA/EPO—dated Jun. 13, 2019.

ZTE et al., "Remaining Details on Codebook Based UL Transmission", 3GPP Draft; R1-1719527 Remaining Details On Codebook Based UL Transmission, 3rd Generation Partnership Project (3GPP), Mobile Competence Centre ; 650, Route Des Lucioles; F-06921 Sophia-Antipolis Ced, vol. RAN WG1; No. Reno; USA; Nov. 27, 2017-Dec. 1, 2017, Nov. 18, 2017 (Nov. 18, 2017); XP051369341, 5 Pages, Retrieved from the Internet: URL:http://www.3gpp.org/ftp/tsg%5Fran/WG1%5FRL1/TSGR1%5F91/Docs/ [retrieved on Nov. 18, 2017], Section 1, 2.1.

* cited by examiner

HYBRID CLOSED-LOOP AND OPEN-LOOP MULTIPLE-INPUT MULTIPLE-OUTPUT SCHEME IN NEW RADIO

CROSS REFERENCE TO RELATED APPLICATION UNDER 35 U.S.C § 119

This application claims priority to U.S. Provisional Application No. 62/653,233, filed on Apr. 5, 2018, entitled "TECHNIQUES AND APPARATUSES FOR A HYBRID CLOSED-LOOP AND OPEN-LOOP MULTIPLE-INPUT MULTIPLE-OUTPUT SCHEME IN NEW RADIO," which is hereby expressly incorporated by reference herein.

FIELD OF THE DISCLOSURE

Aspects of the present disclosure generally relate to wireless communication, and more particularly to techniques and apparatuses for a hybrid closed-loop and open-loop multiple-input multiple-output (MIMO) scheme in new radio (NR).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include applying an open-loop multiple-input multiple-output (MIMO) scheme among a plurality of antenna groups associated with a plurality of antennas, wherein phase coherence cannot be maintained between the plurality of antenna groups; and applying a closed-loop MIMO scheme among antennas within each antenna group of the plurality of antenna groups, wherein phase coherence can be maintained between antennas included in each antenna group of the plurality of antenna groups.

In some aspects, a wireless communication device for wireless communication may include memory and one or more processors operatively coupled to the memory. The memory and the one or more processors may be configured to apply an open-loop MIMO scheme among a plurality of antenna groups associated with a plurality of antennas, wherein phase coherence cannot be maintained between the plurality of antenna groups; and apply a closed-loop MIMO scheme among antennas within each antenna group of the plurality of antenna groups, wherein phase coherence can be maintained between antennas included in each antenna group of the plurality of antenna groups.

In some aspects, a non-transitory computer-readable medium may store one or more instructions for wireless communication. The one or more instructions, when executed by one or more processors of a wireless communication device, may cause the one or more processors to apply an open-loop MIMO scheme among a plurality of antenna groups associated with a plurality of antennas, wherein phase coherence cannot be maintained between the plurality of antenna groups; and apply a closed-loop MIMO scheme among antennas within each antenna group of the plurality of antenna groups, wherein phase coherence can be maintained between antennas included in each antenna group of the plurality of antenna groups.

In some aspects, an apparatus for wireless communication may include means for applying an open-loop MIMO scheme among a plurality of antenna groups associated with a plurality of antennas, wherein phase coherence cannot be maintained between the plurality of antenna groups; and means for applying a closed-loop MIMO scheme among antennas within each antenna group of the plurality of antenna groups, wherein phase coherence can be maintained between antennas included in each antenna group of the plurality of antenna groups.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
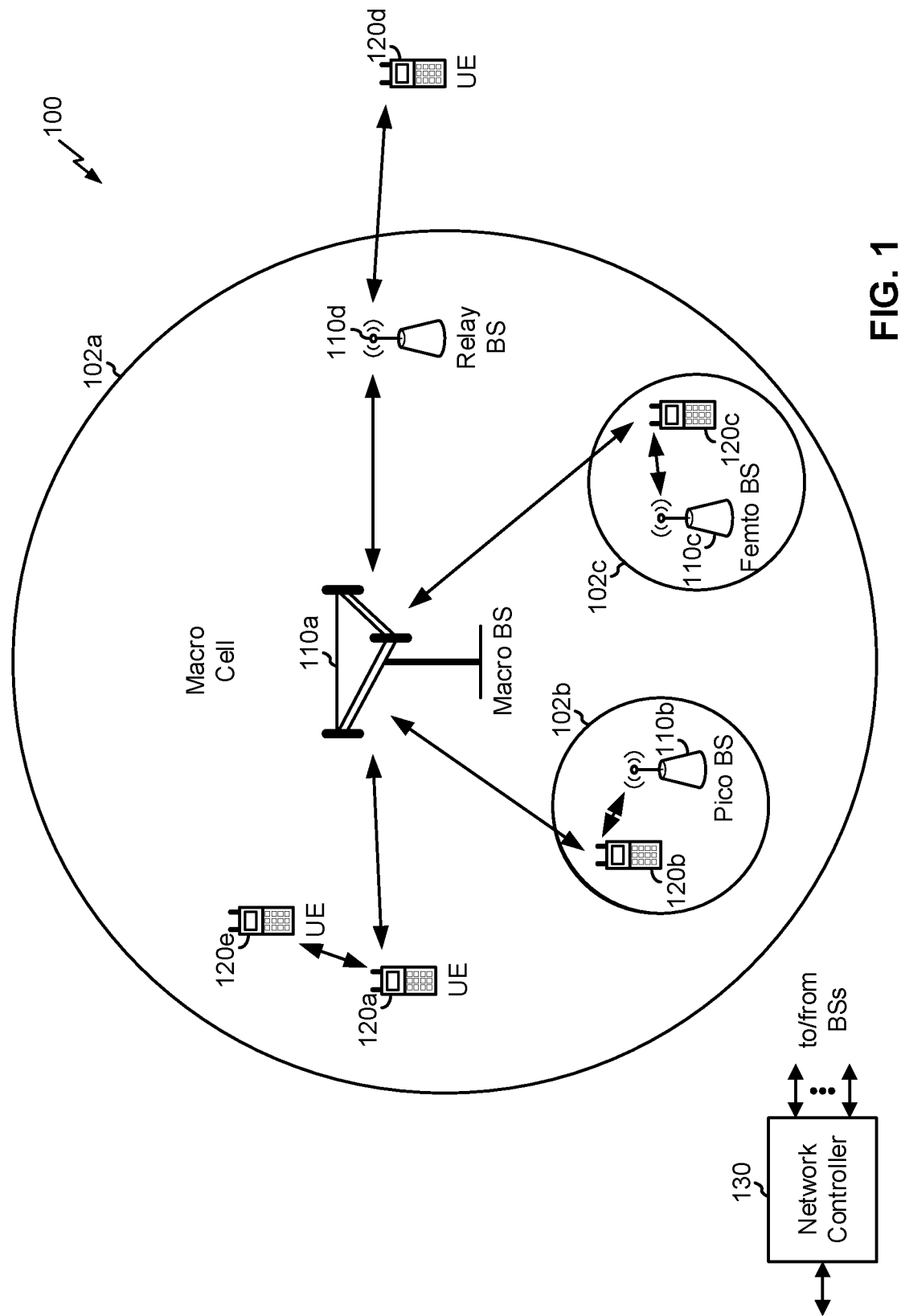
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
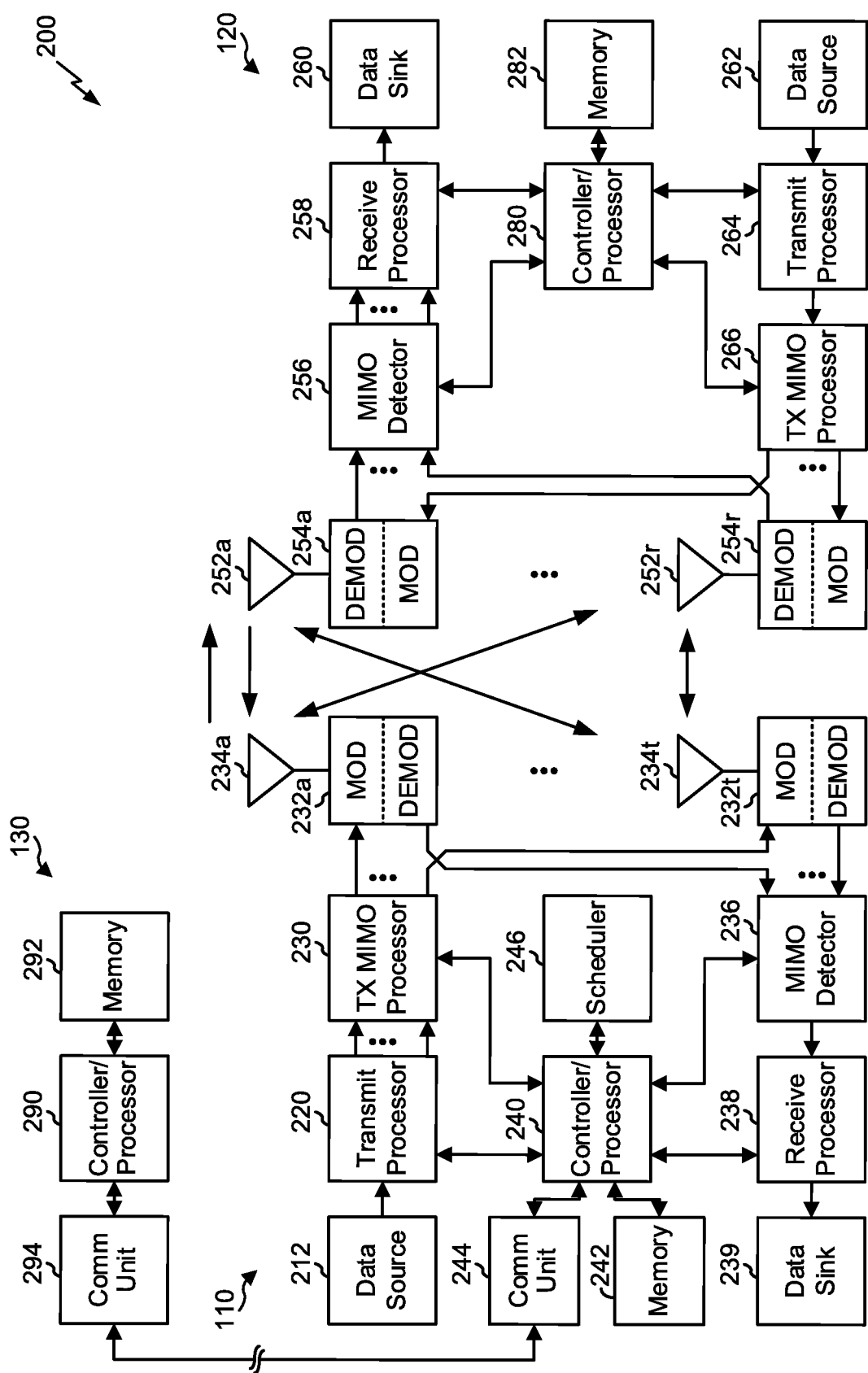
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with a hybrid closed-loop and open-loop MIMO scheme in NR, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for applying an open-loop MIMO scheme among a plurality of antenna groups associated with a plurality of antennas, wherein phase coherence cannot be maintained between the plurality of antenna groups; means for applying a closed-loop MIMO scheme among antennas within each antenna group of the plurality of antenna groups, wherein phase coherence can be maintained between antennas included in each antenna group of the plurality of antenna groups; and/or the like. In some aspects, such means may include one or more components of UE 120 described in connection with FIG. 2.

In some aspects, base station 110 may include means for applying an open-loop MIMO scheme among a plurality of antenna groups associated with a plurality of antennas, wherein phase coherence cannot be maintained between the plurality of antenna groups; means for applying a closed-loop MIMO scheme among antennas within each antenna group of the plurality of antenna groups, wherein phase coherence can be maintained between antennas included in each antenna group of the plurality of antenna groups; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
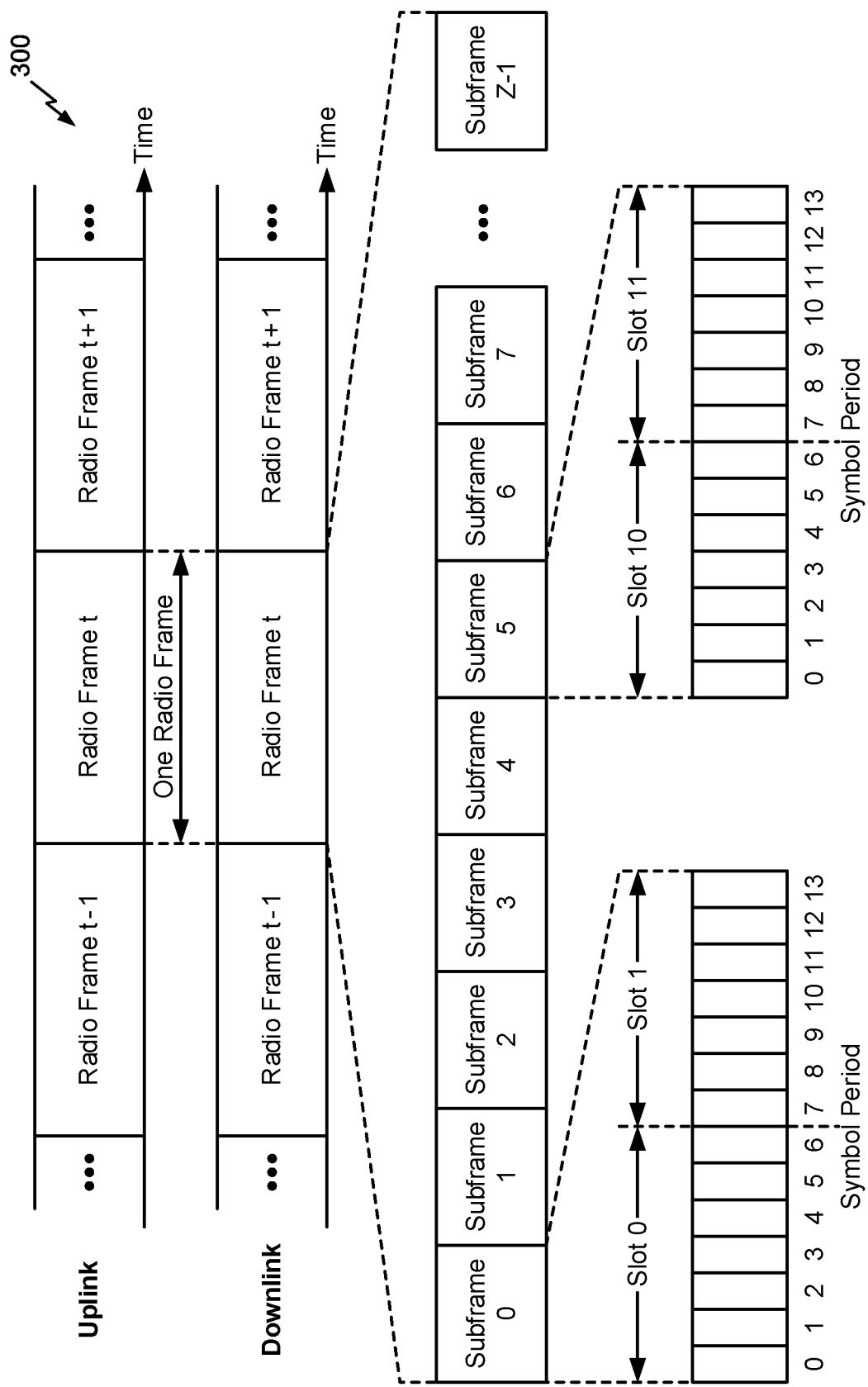
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
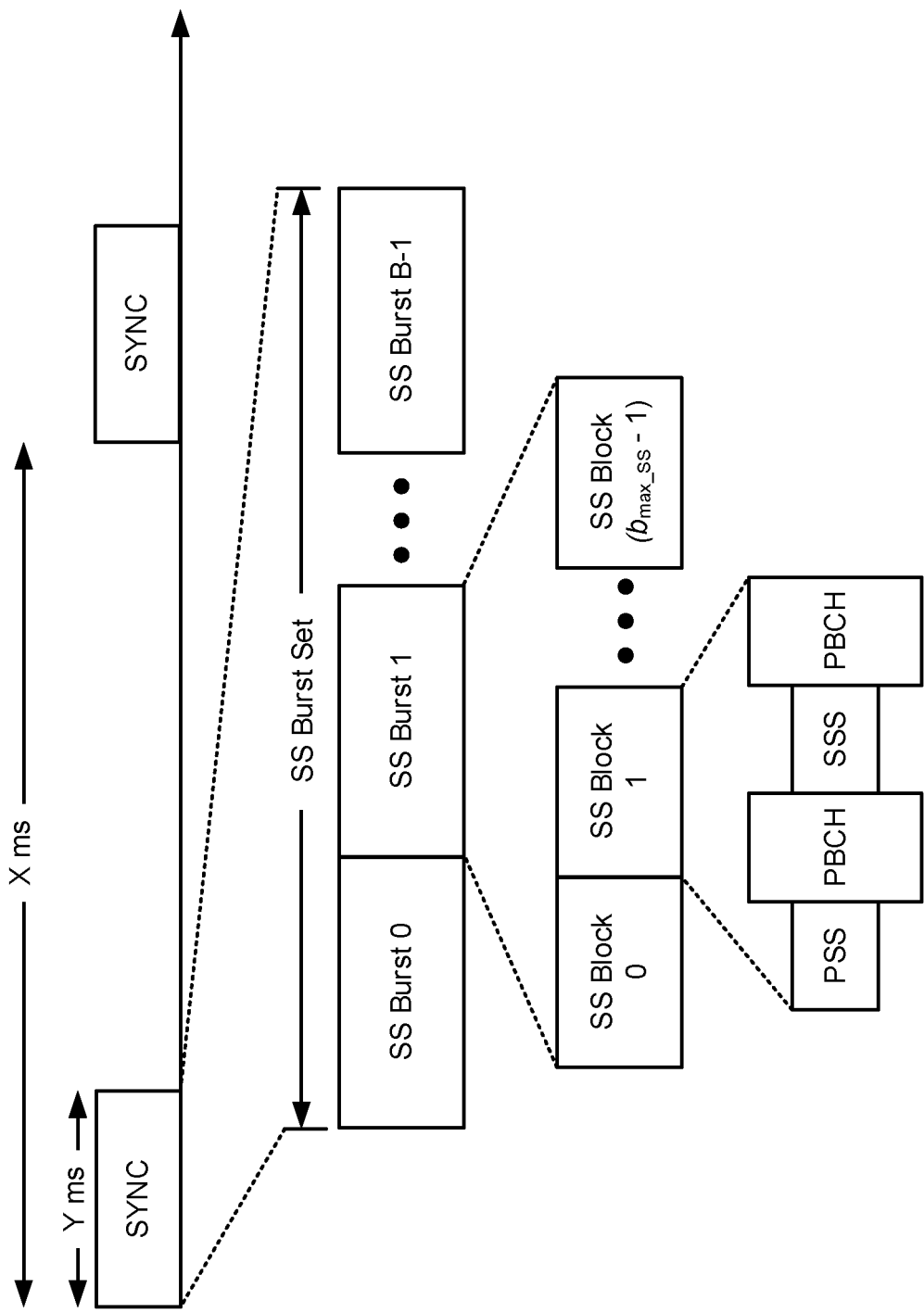
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
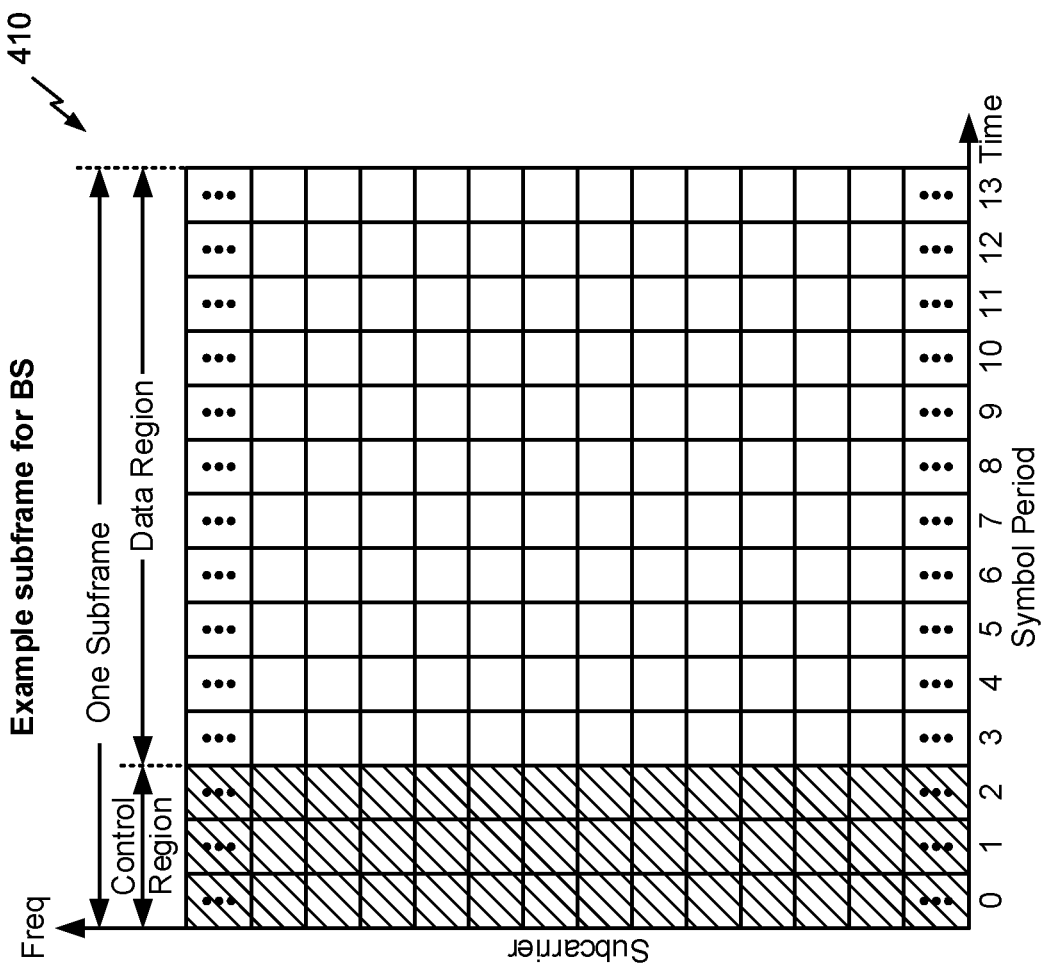
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

A wireless communication device (e.g., a UE, a base station, and/or the like) may be capable of achieving partial coherence among antenna ports of the wireless communication device. Partial coherence means that the wireless communication device can maintain phase coherence (e.g., a substantially constant relative phase difference) between some antennas of the wireless communication device, but not between all antennas of the wireless communication device.

As an example, assume that a wireless communication device includes four transmit antennas (e.g., antenna 0 through antenna 3). In this example, the wireless communication device can maintain phase coherence between antenna 0 and antenna 1, and can maintain phase coherence between antenna 2 and antenna 3. However, the wireless communication device cannot maintain phase coherence between antenna 0 and antenna 2, and cannot maintain phase coherence between antenna 1 and antenna 3. In other words, the wireless communication device can maintain phase coherence between antennas included in each of two antenna groups (e.g., a first antenna group including antennas 0 and 1, and a second antenna group including antennas 2 and 3), but cannot maintain phase coherence between the two antenna groups. Here, the wireless communication device may be described as being capable of achieving partial coherence among antenna ports of the wireless communication device.

In some wireless networks (e.g., an LTE network), a wireless communication device is assumed to be capable of achieving full coherence. In such a case, a MIMO scheme, associated transmitting a signal using the multiple antennas of the wireless communication device, is designed under the assumption of full coherence. However, in a wireless network (e.g., a NR network) in which a wireless communication device may be capable of achieving partial coherence (e.g., due to hardware limitations of the wireless communication device), another approach for designing a MIMO scheme is needed.

Some aspects described herein provide techniques and apparatuses for a MIMO scheme associated with transmitting over multiple antennas of a wireless communication device that is capable of achieving partial coherence among antenna ports of the wireless communication device. In some aspects, the MIMO scheme may be a hybrid closed-loop and open-loop MIMO scheme, as described in further detail below.

Notably, while the example aspects described herein are described in the context of four antennas in two antenna groups, other aspects are possible. In other words, the number of antennas is not limited to four and the number of antenna groups is not limited to two. Rather, aspects described herein can be applied to any number of antennas in any number of antenna groups. Further, the number of antennas in a given group is not limited to two, and each antenna group may include the same number of antennas or a different numbers of antennas.

Figure 5A:
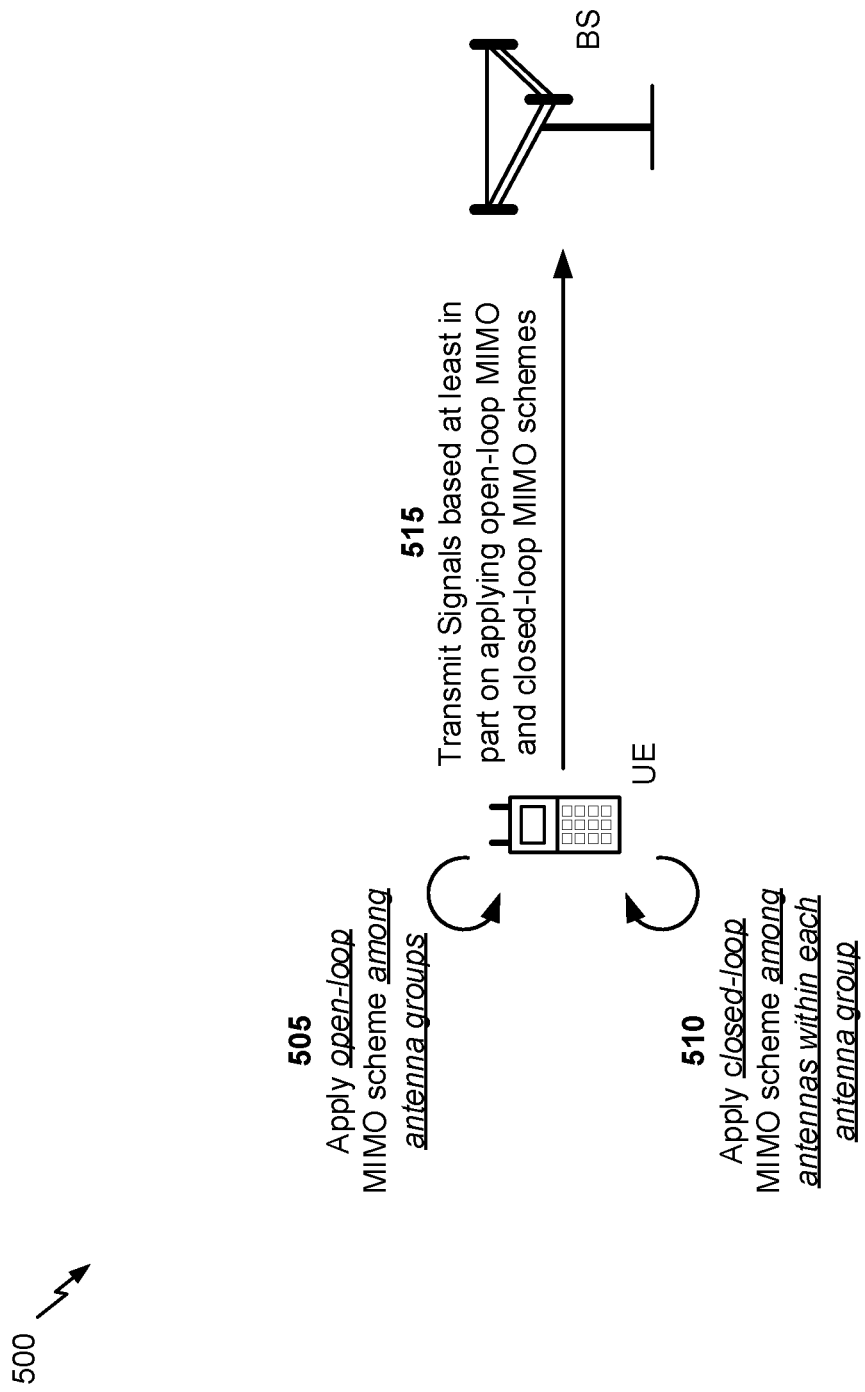
FIGS. 5A and 5B are diagrams illustrating an example associated with a hybrid closed-loop and open-loop MIMO scheme, in accordance with various aspects of the present disclosure.
Figure 5B:
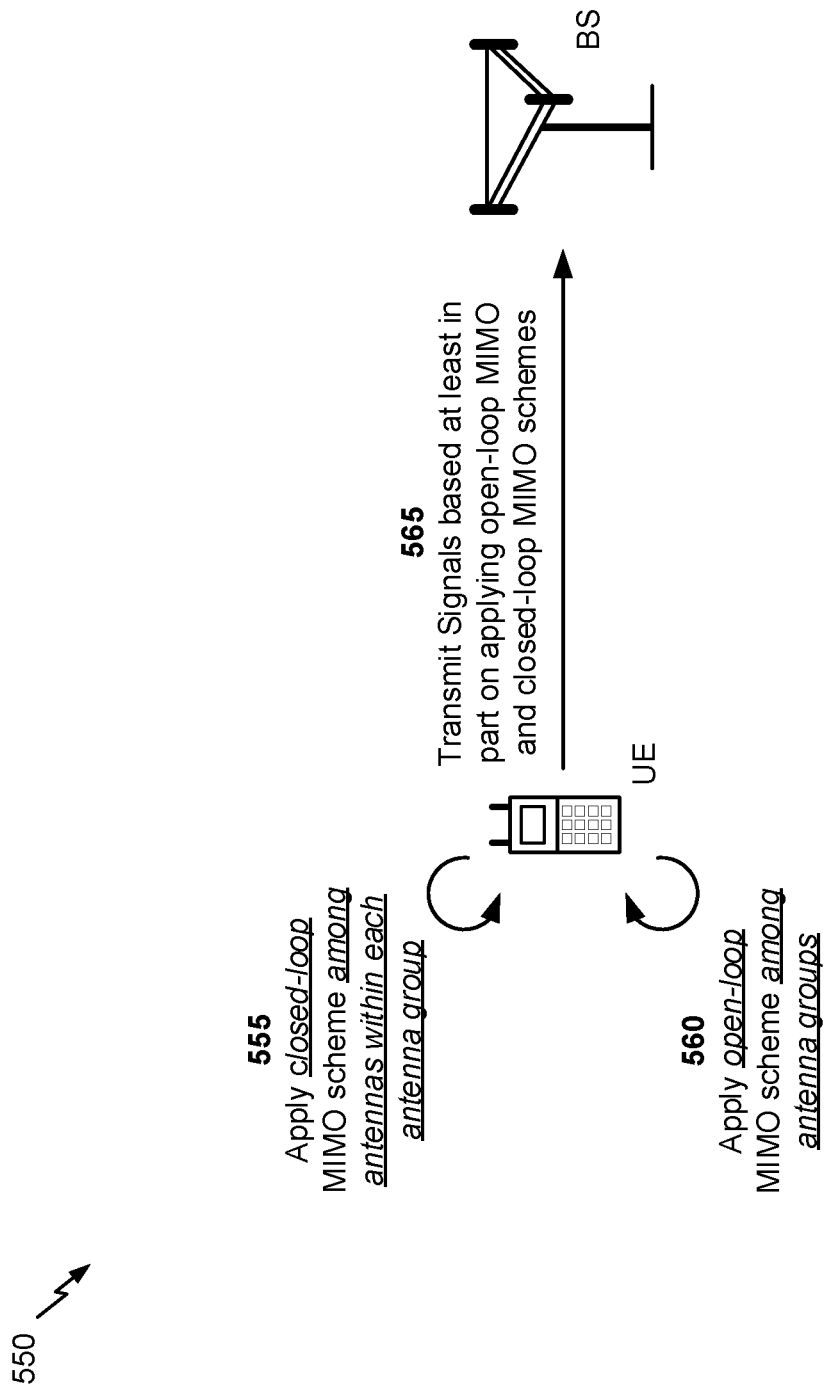

FIGS. 5A and 5B are diagrams illustrating examples 500 and 550 associated with a hybrid closed-loop and open-loop MIMO scheme, in accordance with various aspects of the present disclosure. Notably, while examples 500 and 550 are shown and described as being associated with hybrid closed-loop and open-loop MIMO schemes for transmitting uplink signals (i.e., from a UE to a base station), the techniques and apparatuses described in association with examples 500 and 550 may be similarly applied to hybrid closed-loop and open-loop MIMO schemes for transmitting downlink signals (i.e., from a base station to a UE) and/or transmitting sidelink signals (i.e., from a UE to a UE or from a base station to a base station), in some aspects.

For the purposes of examples 500 and 550, a UE is capable of achieving partial coherence between four antenna ports of the UE. In particular, the UE includes four antennas (e.g., antenna 0 through antenna 3), and is capable of maintaining phase coherence between antennas included in antenna group A, which includes antennas 0 and 1, and between antennas included in antenna group B, which includes antennas 2 and 3. Further, the UE is not capable of maintaining phase coherence between antenna groups A and B.

In some aspects, the UE may apply a hybrid closed-loop and open-loop MIMO scheme in association with transmitting signals on the uplink. Generally, a hybrid closed-loop and open-loop MIMO scheme may include a transmission scheme, used by a transmitter in association with transmitting a communication to a receiver, that includes applying both a closed-loop MIMO scheme and an open-loop MIMO scheme (in either order) in association with transmitting the communication.

In some aspects, the closed-loop MIMO scheme may be a closed-loop diversity scheme that uses rank 1 precoding, a closed-loop multiplexing scheme that uses at least rank 2 precoding, or another type of closed-loop MIMO scheme. In some aspects, the UE may receive information that identifies the closed-loop MIMO scheme, to be applied by the UE as part of the hybrid closed-loop and open-loop MIMO scheme, via downlink control information (DCI).

In some aspects, the open-loop MIMO scheme may be an open-loop diversity scheme that uses space frequency block coding (SFBC), space-time block coding (STBC), antenna selection, antenna switching, antenna cycling, rank 1 precoder cycling, and/or another type of open-loop MIMO scheme. In some aspects, the open-loop scheme may be a cyclic delay diversity (CDD) scheme that is implemented in the time domain or in the frequency domain. In a time domain implementation, one antenna may transmit data and another other antenna may transmit a the cyclic shifted version (in the time domain) of the data. In a frequency domain implementation, one antenna may transmit data and another antenna may transmit a phase shifted version (in frequency domain) of the data. Notably, the time domain cyclic shift is mathematically equivalent to the phase shift in frequency domain.

In some aspects, the UE may receive information that identifies the open-loop MIMO scheme, to be applied by the UE as part of the hybrid closed-loop and open-loop MIMO scheme, via RRC signaling.

In some aspects, the hybrid closed-loop and open-loop MIMO scheme may include applying the open-loop MIMO scheme followed by applying the closed-loop MIMO scheme, an example of which is shown in FIG. 5A. For example, as shown by reference number 505 of FIG. 5A, the hybrid closed-loop and open-loop MIMO scheme may include applying an open-loop MIMO scheme among antenna groups (e.g., among antenna groups A and B). As shown by reference number 510, after applying the open-loop MIMO scheme among the antenna groups, the UE may apply a closed-loop MIMO scheme among antennas within each antenna group (e.g., among antennas 0 and 1 within antenna group A, and among antennas 2 and 3 within antenna group B). As shown by reference number 515 of FIG. 5A, the UE may then transmit signals (e.g., a signal associated with a SRS, a signal associated with a PUSCH transmission, and/or the like) based at least in part on applying the hybrid closed-loop and open-loop MIMO scheme. In some aspects, the UE may receive information indicating that the open-loop MIMO scheme is to be applied before the closed-loop MIMO scheme via RRC signaling.

As a particular example, the hybrid closed-loop and open-loop MIMO scheme may include applying an open-loop diversity scheme that uses SFBC among antenna groups A and B, followed by applying a closed-loop diversity scheme that uses rank 1 precoding among antennas within each of antenna groups A and B. For example, assume that the UE is to transmit data bits $x_0$ and $x_1$ (e.g., $[x_0, x_1]$) on a first tone (e.g., tone 0) and a second tone (e.g., tone 1). Here, the UE may apply SFBC across antenna groups A and B first. Next, the UE may apply rank 1 precoding among antennas 0 and 1 within antenna group A using precoder $$\begin{bmatrix} p_0 \\ p_1 \end{bmatrix}$$

on tone 0 and tone 1, and may apply rank 1 precoding among antennas 2 and 3 within antenna group B using precoder $$\begin{bmatrix} p_2 \\ p_3 \end{bmatrix}$$

on tone 0 and tone 1. After these steps, the UE may transmit signals over the four antennas, which can be expressed as:

| SFBC + rank 1 diversity | Tone 0 | Tone 1 |
| --- | --- | --- |
| Antenna 0 | $p_0 x_0$ | $p_0 x_1$ |
| Antenna 1 | $p_1 x_0$ | $p_1 x_1$ |
| Antenna 2 | $-p_2 x_1^*$ | $p_2 x_0^*$ |
| Antenna 3 | $-p_3 x_1^*$ | $p_3 x_0^*$ |

Notably, the above hybrid closed-loop and open-loop MIMO scheme reduces to traditional SFBC with antenna selection if $p_1 = p_3 = 0$ or $p_0 = p_2 = 0$.

Without loss of generality, and assuming one receive antenna at the base station (for simplicity), received signals on tones 0 and 1 can be expressed as:

$$y_0 = (h_0 p_0 + h_1 p_1) x_0 - (h_2 p_2 + h_3 p_3) x_1^* + n_0$$

$$y_1 = (h_0 p_0 + h_1 p_1) x_1 + (h_2 p_2 + h_3 p_3) x_0^* + n_1$$

where $h_0$, $h_1$, $h_2$, $h_3$ are channels from the four transmit antennas to the receive antenna.

Here, by conjugating to restructure the received signals, the following formulation is reached:

$$\begin{bmatrix} y_0 \\ y_1^* \end{bmatrix} = \begin{pmatrix} h_0 p_0 + h_1 p_1 & -(h_2 p_2 + h_3 p_3) \\ (h_2 p_2 + h_3 p_3)^* & (h_0 p_0 + h_1 p_1)^* \end{pmatrix} \begin{bmatrix} x_0 \\ x_1^* \end{bmatrix} + \begin{bmatrix} n_0 \\ n_1^* \end{bmatrix} =$$

$$\begin{pmatrix} \tilde{h}_0 & -\tilde{h}_1 \\ (\tilde{h}_1)^* & (\tilde{h}_0)^* \end{pmatrix} \begin{bmatrix} x_0 \\ x_1^* \end{bmatrix} + \begin{bmatrix} n_0 \\ n_1^* \end{bmatrix}$$

where $\tilde{h}_0 = h_0 p_0 + h_1 p_1$ and $\tilde{h}_1 = h_2 p_2 + h_3 p_3$), which is a standard formulation of received signals associated with a traditional SFBC transmission scheme. Therefore, a traditional SFBC receiver can be applied as below:

$$\begin{bmatrix} t_0 \\ t_1 \end{bmatrix} = \begin{pmatrix} (\tilde{h}_0)^* & \tilde{h}_1 \\ -(\tilde{h}_1)^* & \tilde{h}_0 \end{pmatrix} \begin{bmatrix} y_0 \\ y_1^* \end{bmatrix} = \begin{pmatrix} (\tilde{h}_0)^* & \tilde{h}_1 \\ -(\tilde{h}_1)^* & \tilde{h}_0 \end{pmatrix} \begin{pmatrix} \tilde{h}_0 & -\tilde{h}_1 \\ (\tilde{h}_1)^* & (\tilde{h}_0)^* \end{pmatrix} \begin{bmatrix} x_0 \\ x_1^* \end{bmatrix} + \begin{bmatrix} \tilde{n}_0 \\ \tilde{n}_1^* \end{bmatrix} =$$

$$\begin{pmatrix} |\tilde{h}_0|^2 + |\tilde{h}_1|^2 & 0 \\ 0 & |\tilde{h}_0|^2 + |\tilde{h}_1|^2 \end{pmatrix} \begin{bmatrix} x_0 \\ x_1^* \end{bmatrix} + \begin{bmatrix} \tilde{n}_0 \\ \tilde{n}_1^* \end{bmatrix}$$

where $\begin{bmatrix} \tilde{n}_0 \\ \tilde{n}_1^* \end{bmatrix} = \begin{pmatrix} (\tilde{h}_0)^* & \tilde{h}_1 \\ -(\tilde{h}_1)^* & \tilde{h}_0 \end{pmatrix} \begin{bmatrix} n_0 \\ n_1^* \end{bmatrix}$.

As another particular example, the hybrid closed-loop and open-loop MIMO scheme may include applying an open-loop diversity scheme that uses SFBC among antenna groups A and B, followed by applying a closed-loop multiplexing scheme that uses rank 2 precoding among antennas within each of antenna groups A and B. For example, assume that the UE is to transmit data bits $x_0$, $x_1$ $x_2$, and $x_3$ (e.g., $[x_0, x_1, x_2, x3]$) on tone 0 and tone 1. Here, the UE may apply SFBC across antenna groups A and B. Next, the UE may apply closed-loop rank 2 precoding among antennas 0 and 1 within antenna group A with precoder $$\begin{bmatrix} p_{00} & p_{01} \\ p_{10} & p_{11} \end{bmatrix}$$

on tone 0 and tone 1, and may apply closed-loop rank 2 precoding among antennas 2 and 3 within antenna group B using precoder $$\begin{bmatrix} p_{22} & p_{23} \\ p_{32} & p_{33} \end{bmatrix}$$

on tone 0 and tone 1. After these steps, the UE may transmit signals over the four antennas, which can be expressed as:

| SFBC + rank 2 multiplexing | Tone 0 | Tone 1 |
| --- | --- | --- |
| Antenna 0 | $p_{00} x_0 + p_{01} x_1$ | $p_{00} x_2 + p_{01} x_3$ |
| Antenna 1 | $p_{10} x_0 + p_{11} x_1$ | $p_{10} x_2 + p_{11} x_3$ |
| Antenna 2 | $-p_{22} x_2^* - p_{23} x_3^*$ | $p_{22} x_0^* + p_{23} x_1^*$ |
| Antenna 3 | $-p_{32} x_2^* - p_{33} x_3^*$ | $p_{32} x_0^* + p_{13} x_1^*$ |

A special case of the above hybrid closed-loop and open-loop MIMO scheme occurs when $$\begin{bmatrix} p_{00} & p_{01} \\ p_{10} & p_{11} \end{bmatrix} = \begin{bmatrix} p_{22} & p_{23} \\ p_{32} & p_{33} \end{bmatrix} = \begin{bmatrix} 1 & 0 \\ 0 & 1 \end{bmatrix}.$$

In such a case, the signals transmitted over the four antennas and two tones can be simplified as:

| Simplified SFBC + rank 2 multiplexing | Tone 0 | Tone 1 |
| --- | --- | --- |
| Antenna 0 | $x_0$ | $x_2$ |
| Antenna 1 | $x_1$ | $x_3$ |
| Antenna 2 | $-x_2^*$ | $x_0^*$ |
| Antenna 3 | $-x_3^*$ | $x_1^*$ |

Notably, the simplified hybrid closed-loop and open-loop MIMO scheme results in a superposition of two SFBC-based signals (e.g., on top of one another). As such this hybrid closed-loop and open-loop MIMO scheme is a rank 2 MIMO scheme.

At a first receive antenna at the base station, received signals over tones 0 and 1 can be expressed as:

$$y_0 = (h_0 p_{00} + h_1 p_{10})x_0 + (h_0 p_{01} + h_1 p_{11})x_1 - (h_2 p_{22} + h_3 p_{32})x_2^* - (h_2 p_{23} + h_3 p_{33})x_3^* + n_0$$

$$y_1 = (h_2 p_{22} + h_3 p_{32})x_0^* + (h_2 p_{23} + h_3 p_{33})x_1^* + (h_0 p_{00} + h_1 p_{10})x_2 + (h_0 p_{01} + h_1 p_{11})x_3 + n_1$$

where $h_0$, $h_1$, $h_2$, $h_3$ are channels from the four transmit antennas to the first receive antenna.

Here, by conjugating to restructure the received signals, the following formulation is reached:

$$\begin{bmatrix} y_0 \\ y_1^* \end{bmatrix} = \begin{pmatrix} \tilde{h}_0 & -\tilde{h}_2 \\ \tilde{h}_2^* & \tilde{h}_0^* \end{pmatrix} \begin{bmatrix} x_0 \\ x_2^* \end{bmatrix} + \begin{pmatrix} \tilde{h}_1 & -\tilde{h}_3 \\ \tilde{h}_3^* & \tilde{h}_1^* \end{pmatrix} \begin{bmatrix} x_1 \\ x_3^* \end{bmatrix} + \begin{bmatrix} n_0 \\ n_1^* \end{bmatrix},$$

where $\tilde{h}_0 = (h_0 p_{00} + h_1 p_{10}) = [h_0 \ h_1] \begin{bmatrix} p_{00} \\ p_{10} \end{bmatrix}$, $\tilde{h}_1 = (h_0 p_{01} + h_1 p_{11}) = [h_0 \ h_1] \begin{bmatrix} p_{01} \\ p_{11} \end{bmatrix}$, $\tilde{h}_2 = (h_2 p_{22} + h_3 p_{32}) = [h_2 \ h_3] \begin{bmatrix} p_{22} \\ p_{32} \end{bmatrix}$, and and $\tilde{h}_3 = (h_2 p_{23} + h_3 p_{33}) = [h_2 \ h_3] \begin{bmatrix} p_{23} \\ p_{33} \end{bmatrix}$.

Here, since there are four unknowns with only two observations, at least one more receive antenna is needed. Received signals on a second receive antenna can be modeled as:

$$\begin{bmatrix} z_0 \\ z_1^* \end{bmatrix} = \begin{pmatrix} \tilde{g}_0 & -\tilde{g}_2 \\ \tilde{g}_2^* & \tilde{g}_0^* \end{pmatrix} \begin{bmatrix} x_0 \\ x_2^* \end{bmatrix} + \begin{pmatrix} \tilde{g}_1 & -\tilde{g}_3 \\ \tilde{g}_3^* & \tilde{g}_1^* \end{pmatrix} \begin{bmatrix} x_1 \\ x_3^* \end{bmatrix} + \begin{bmatrix} w_0 \\ w_1^* \end{bmatrix}.$$

In some aspects, the hybrid closed-loop and open-loop MIMO scheme may include applying the closed-loop MIMO scheme followed by applying the open-loop MIMO scheme, an example of which is shown in FIG. 5B. For example, as shown by reference numbers 555 of FIG. 5B, the hybrid closed-loop and open-loop MIMO scheme may include applying a closed-loop MIMO scheme among antennas within each antenna group (e.g., among antennas 0 and 1 within antenna group A, and among antennas 2 and 3 within antenna group B). As shown by reference number 560, after applying the closed-loop MIMO scheme among antennas within each antenna group, the UE may apply the open-loop MIMO scheme among the antenna groups (e.g., among antenna groups A and B). As shown by reference number 565 of FIG. 5B, the UE may then transmit signals (e.g., a signal associated with a SRS, a signal associated with a PUSCH transmission, and/or the like) based at least in part on applying the hybrid closed-loop and open-loop MIMO scheme. In some aspects, the UE may receive information indicating that the closed-loop MIMO scheme is to be applied before the open-loop MIMO scheme via RRC signaling.

As a particular example, the hybrid closed-loop and open-loop MIMO scheme may include applying a closed-loop diversity scheme that uses rank 1 precoding among antennas within each antenna group, followed by applying an open-loop diversity scheme that uses SFBC among the antenna groups. For example, assume that the UE is to transmit data bits $x_0$ and $x_1$ (e.g., $[x_0, x_1]$) on tone 0 and tone 1. Here, the UE may apply rank 1 precoding among antennas 0 and 1 within antenna group A using precoder $$\begin{bmatrix} p_0 \\ p_1 \end{bmatrix}$$

on tone 0 and tone 1, and may apply rank 1 precoding among antennas 2 and 3 within antenna group B using precoder $$\begin{bmatrix} p_2 \\ p_3 \end{bmatrix}$$

on tone 0 and tone 1. Next, the UE may apply SFBC across antenna groups A and B first. After these steps, the UE may transmit signals over the four antennas, which can be expressed as:

| SFBC + rank 1 diversity | Tone 0 | Tone 1 |
| --- | --- | --- |
| Antenna 0 | $p_0 x_0$ | $p_2 x_1$ |
| Antenna 1 | $p_1 x_0$ | $p_3 x_1$ |
| Antenna 2 | $-(p_2 x_1)^*$ | $(p_0 x_0)^*$ |
| Antenna 3 | $-(p_3 x_1)^*$ | $(p_1 x_0)^*$ |

Notably, if the two precoders are the same across the antenna groups, the hybrid closed-loop and open-loop MIMO scheme becomes identical to the first particular example described above in association with FIG. 5A. In other words, the ordering of SFBC and rank 1 precoding is irrelevant if the same precoder is applied across the antenna groups. However, in practice, different precoders may be used. In such cases, the order of application of the open-loop MIMO scheme and the closed-loop MIMO scheme is relevant.

Without loss of generality, and assuming one receive antenna at the base station (for simplicity), received signals on tones 0 and 1 can be expressed as:

$$y_0 = (h_0 p_0 + h_1 p_1)x_0 - (h_2 p_2^* + h_3 p_3^*)x_1^* + n_0$$

$$y_1 = (h_0 p_2 + h_1 p_3)x_1 + (h_2 p_0^* + h_3 p_1^*)x_0^* + n_1$$

where $h_0$, $h_1$, $h_2$, $h_3$ are channels from the four transmit antennas to the receive antenna.

Here, by conjugating to restructure the received signals, the following formulation is reached:

$$\begin{bmatrix} y_0 \\ y_1^* \end{bmatrix} = \begin{pmatrix} h_0 p_0 + h_1 p_1 & -(h_2 p_2^* + h_3 p_3^*) \\ h_2^* p_0 + h_3^* p_1 & h_0^* p_2^* + h_1^* p_3^* \end{pmatrix} \begin{bmatrix} x_0 \\ x_1^* \end{bmatrix} + \begin{bmatrix} n_0 \\ n_1^* \end{bmatrix}$$

As another particular example, the hybrid closed-loop and open-loop MIMO scheme may include applying a closed-loop multiplexing scheme that uses rank 2 precoding among antennas of each of the antenna groups, followed by applying an open-loop diversity scheme that uses SFBC among the antenna groups. For example, assume that the UE is to transmit data bits $x_0$, $x_1$, $x_2$, and $x_3$ (e.g., $[x_0, x_1, x_2, x3]$) on tone 0 and tone 1. Here, the UE may apply closed-loop rank 2 precoding among antennas 0 and 1 within antenna group A with precoder $$\begin{bmatrix} p_{00} & p_{01} \\ p_{10} & p_{11} \end{bmatrix}$$

on tone 0 and tone 1, and may apply closed-loop rank 2 precoding among antennas 2 and 3 within antenna group B using precoder $$\begin{bmatrix} p_{22} & p_{23} \\ p_{32} & p_{33} \end{bmatrix}$$

on tone 0 and tone 1. Next, the UE may apply SFBC across antenna groups A and B. After these steps, the UE may transmit signals over the four antennas, which can be expressed as:

| SFBC + rank 2 multiplexing | Tone 0 | Tone 1 |
|---|---|---|
| Antenna 0 | $p_{00}x_0 + p_{01}x_1$ | $p_{22}x_2 + p_{23}x_3$ |
| Antenna 1 | $p_{10}x_0 + p_{11}x_1$ | $p_{32}x_2 + p_{33}x_3$ |
| Antenna 2 | $-p_{22}x_2^* - p_{23}x_3^*$ | $p_{00}x_0^* + p_{01}x_1^*$ |
| Antenna 3 | $-p_{32}x_2^* - p_{33}x_3^*$ | $p_{10}x_0^* + p_{11}x_1^*$ |

Here, if $$\begin{bmatrix} p_{00} & p_{01} \\ p_{10} & p_{11} \end{bmatrix} = \begin{bmatrix} p_{22} & p_{23} \\ p_{32} & p_{33} \end{bmatrix},$$

the hybrid closed-loop and open-loop MIMO scheme becomes identical the second particular example described in association with FIG. 5A. However, in practice, different precoders are used for the two antenna groups, except in the following special case.

In order to simplify the hybrid closed-loop and open-loop MIMO scheme, the two precoding matrices can be assumed to be identity matrices (i.e., $p_{00}=p_{11}=1$, $p_{01}=p_{10}=0$, $p_{22}=p_{33}=1$, $p_{23}=p_{32}=0$), which results in signals that can be expressed as:

| Simplified SFBC + rank 2 multiplexing | Tone 0 | Tone 1 |
|---|---|---|
| Antenna 0 | $x_0$ | $x_2$ |
| Antenna 1 | $x_1$ | $x_3$ |
| Antenna 2 | $-x_2^*$ | $x_0^*$ |
| Antenna 3 | $-x_3^*$ | $x_1^*$ |

Thus, received signals on a first receive antenna over tones 0 and 1 can be expressed as:

$$y_0 = (h_0 \; h_1 \; h_2 \; h_3)\begin{bmatrix} x_0 \\ x_1 \\ -x_2^* \\ -x_3^* \end{bmatrix}$$

$$y_1 = (h_0 \; h_1 \; h_2 \; h_3)\begin{bmatrix} x_2 \\ x_3 \\ x_0^* \\ x_1^* \end{bmatrix}$$

Here, since one receive antenna is not sufficient to solve the above equations, at least two receive antennas are needed. The received signals on a second receive antenna over tones 0 and 1 can be expressed as:

$$z_0 = (g_0 \; g_1 \; g_2 \; g_3)\begin{bmatrix} x_0 \\ x_1 \\ -x_2^* \\ -x_3^* \end{bmatrix}$$

$$z_1 = (g_0 \; g_1 \; g_2 \; g_3)\begin{bmatrix} x_2 \\ x_3 \\ x_0^* \\ x_1^* \end{bmatrix}$$

where $h_0$, $h_1$, $h_2$, $h_3$ are channels from the four transmit antennas to the first receive antenna, and $g_0$, $g_1$, $g_2$, $g_3$ are channels from the four transmit antennas to the second receive antenna.

Notably, the above received signal formulation is based on the simplified hybrid closed-loop and open-loop MIMO scheme that assumes identity precoders are used in both antenna groups. Under this assumption, the received signal can be formulated as a superposition of two SFBC-based signals. However, when different precoders are used in the antenna groups, the received signal cannot be formulated as a superposition of two SFBC-based signals.

As indicated above, FIGS. 5A and 5B are provided as examples. Other examples are possible and may differ from what was described with respect to FIGS. 5A and 5B.

Figure 6:
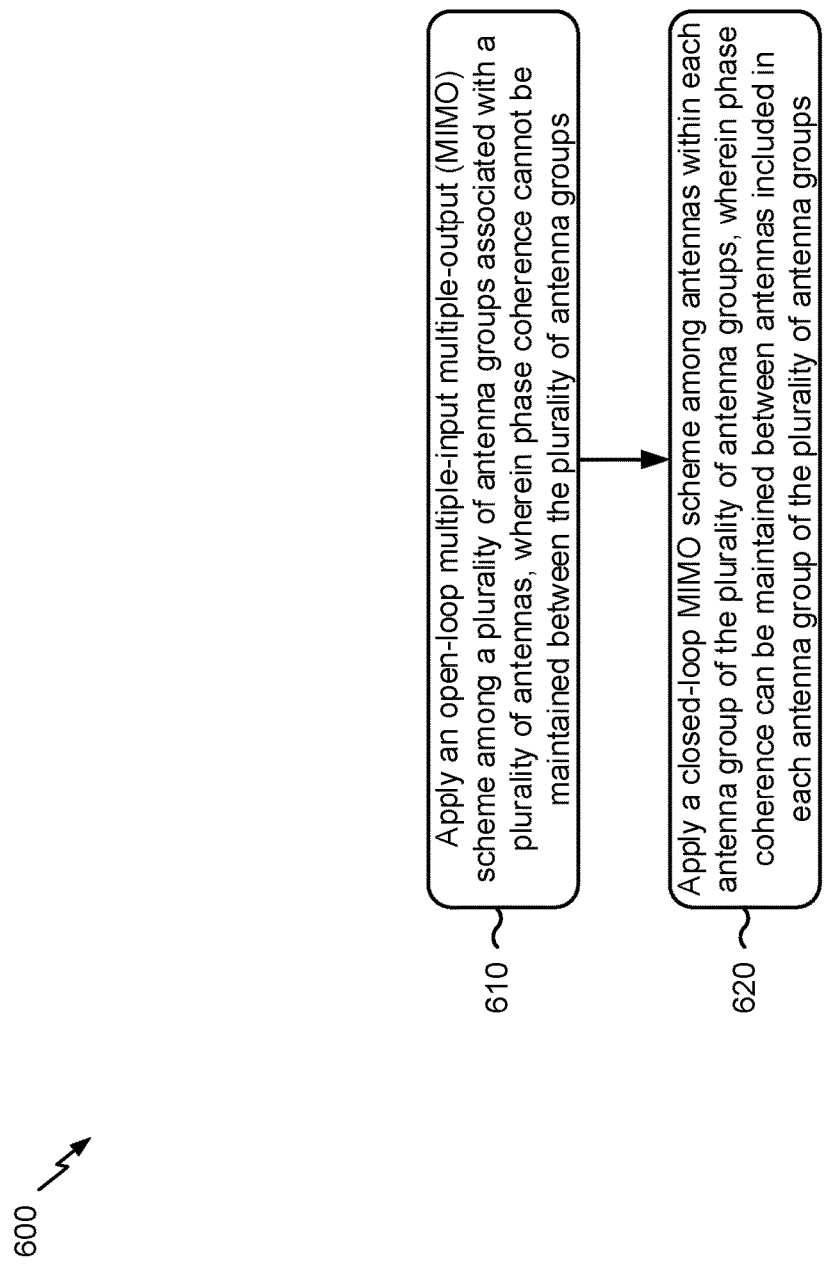
FIG. 6 is a diagram illustrating an example process performed, for example, by a wireless communication device, in accordance with various aspects of the present disclosure.

FIG. 6 is a diagram illustrating an example process 600 performed, for example, by a wireless communication device, in accordance with various aspects of the present disclosure. Example process 600 is an example where a wireless communication device (e.g., UE 120, base station 110) applies a hybrid closed-loop and open-loop MIMO scheme in association with transmitting a communication.

As shown in FIG. 6, in some aspects, process 600 may include applying an open-loop MIMO scheme among a plurality of antenna groups associated with a plurality of antennas, wherein phase coherence cannot be maintained between the plurality of antenna groups (block 610). For example, the wireless communication device (e.g., UE 120, using transmit processor 264, TX MIMO processor 266, controller/processor 280, and/or the like; base station 110, using transmit processor 220, TX MIMO processor 230, controller/processor 240, and/or the like) may apply an open-loop MIMO scheme among a plurality of antenna groups associated with a plurality of antennas, wherein phase coherence cannot be maintained between the plurality of antenna groups, as described above.

As shown in FIG. 6, in some aspects, process 600 may include applying a closed-loop MIMO scheme among antennas within each antenna group of the plurality of antenna groups, wherein phase coherence can be maintained between antennas included in each antenna group of the plurality of antenna groups (block 620). For example, the wireless communication device (e.g., UE 120, using transmit processor 264, TX MIMO processor 266, controller/processor 280, and/or the like; base station 110, using transmit processor 220, TX MIMO processor 230, controller/processor 240, and/or the like) may apply a closed-loop MIMO scheme among antennas within each antenna group of the plurality of antenna groups, wherein phase coherence can be maintained between antennas included in each antenna group of the plurality of antenna groups, as, described above.

Process 600 may include additional aspects, such as any single aspect or any combination of aspects described below and/or in connection with one or more other processes described elsewhere herein.

In some aspects, signals are transmitted using the plurality of antennas based at least in part on applying the open-loop MIMO scheme and the closed-loop MIMO scheme.

In some aspects, the open-loop MIMO scheme is applied before the closed-loop MIMO scheme is applied. In some aspects, information indicating that the open-loop MIMO scheme is to be applied before the closed-loop MIMO scheme is received via RRC signaling.

In some aspects, the closed-loop MIMO scheme is applied before the open-loop MIMO scheme is applied. In some aspects, information indicating that the closed-loop MIMO scheme is to be applied before the open-loop MIMO scheme is received via RRC signaling.

In some aspects, the closed-loop MIMO scheme is a closed-loop diversity scheme that uses rank 1 precoding. In some aspects, the closed-loop MIMO scheme is a closed-loop multiplexing scheme that uses at least rank 2 precoding. In some aspects, information that identifies the closed-loop MIMO scheme is received via DCI.

In some aspects, the open-loop MIMO scheme is an open-loop diversity scheme that uses SFBC. In some aspects, the open-loop MIMO scheme is an open-loop diversity scheme that uses STBC. In some aspects, the open-loop MIMO scheme is an open-loop diversity scheme that uses antenna selection, switching, or cycling. In some aspects, the open-loop MIMO scheme is an open-loop diversity scheme that uses rank 1 precoder cycling. In some aspects, information that identifies the open-loop MIMO scheme is received via RRC signaling.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
   applying an open-loop multiple-input multiple-output (MIMO) scheme among a plurality of antenna groups associated with a plurality of antennas when phase coherence cannot be maintained between the plurality of antenna groups,
      wherein the phase coherence comprises results in a constant relative phase difference between at least two antennas of the plurality of antennas; and
   applying a closed-loop MIMO scheme among antennas within each antenna group of the plurality of antenna groups,
      wherein the phase coherence can be maintained between antennas included in each antenna group of the plurality of antenna groups.

2. The method of claim 1, wherein signals are transmitted using the plurality of antennas based at least in part on applying the open-loop MIMO scheme and the closed-loop MIMO scheme.

3. The method of claim 1, wherein the open-loop MIMO scheme is applied before the closed-loop MIMO scheme is applied.

4. The method of claim 3, wherein information indicating that the open-loop MIMO scheme is to be applied before the closed-loop MIMO scheme is received via radio resource control (RRC) signaling.

5. The method of claim 1, wherein the closed-loop MIMO scheme is applied before the open-loop MIMO scheme is applied.

6. The method of claim 5, wherein information indicating that the closed-loop MIMO scheme is to be applied before the open-loop MIMO scheme is received via radio resource control (RRC) signaling.

7. The method of claim 1, wherein the closed-loop MIMO scheme is a closed-loop diversity scheme that uses rank 1 precoding.

8. The method of claim 1, wherein the closed-loop MIMO scheme is a closed-loop multiplexing scheme that uses at least rank 2 precoding.

9. The method of claim 1, wherein information that identifies the closed-loop MIMO scheme is received via downlink control information (DCI).

10. The method of claim 1, wherein the open-loop MIMO scheme is an open-loop diversity scheme that uses space frequency block coding (SFBC).

11. The method of claim 1, wherein the open-loop MIMO scheme is an open-loop diversity scheme that uses space-time block coding (STBC).

12. The method of claim 1, wherein the open-loop MIMO scheme is an open-loop diversity scheme that uses antenna selection, switching, or cycling.

13. The method of claim 1, wherein the open-loop MIMO scheme is an open-loop diversity scheme that uses rank 1 precoder cycling.

14. The method of claim 1, wherein information that identifies the open-loop MIMO scheme is received via radio resource control (RRC) signaling.

15. A wireless communication device for wireless communication, comprising:
memory; and
one or more processors operatively coupled to the memory, the memory and the one or more processors configured to:
apply an open-loop multiple-input multiple-output (MIMO) scheme among a plurality of antenna groups associated with a plurality of antennas when phase coherence cannot be maintained between the plurality of antenna groups,
wherein the phase coherence results in a constant relative phase difference between at least two antennas of the plurality of antennas; and
apply a closed-loop MIMO scheme among antennas within each antenna group of the plurality of antenna groups,
wherein the phase coherence can be maintained between antennas included in each antenna group of the plurality of antenna groups.

16. The wireless communication device of claim 15, wherein signals are transmitted using the plurality of antennas based at least in part on applying the open-loop MIMO scheme and the closed-loop MIMO scheme.

17. The wireless communication device of claim 15, wherein the open-loop MIMO scheme is applied before the closed-loop MIMO scheme is applied.

18. The wireless communication device of claim 15, wherein the closed-loop MIMO scheme is applied before the open-loop MIMO scheme is applied.

19. The wireless communication device of claim 15, wherein the closed-loop MIMO scheme is a closed-loop diversity scheme that uses rank 1 precoding.

20. The wireless communication device of claim 15, wherein the closed-loop MIMO scheme is a closed-loop multiplexing scheme that uses at least rank 2 precoding.

21. The wireless communication device of claim 15, wherein information that identifies the closed-loop MIMO scheme is received via downlink control information (DCI).

22. The wireless communication device of claim 15, wherein the open-loop MIMO scheme is an open-loop diversity scheme that uses space frequency block coding (SFBC).

23. The wireless communication device of claim 15, wherein the open-loop MIMO scheme is an open-loop diversity scheme that uses space-time block coding (STBC).

24. The wireless communication device of claim 15, wherein the open-loop MIMO scheme is an open-loop diversity scheme that uses antenna selection, switching, or cycling.

25. The wireless communication device of claim 15, wherein the open-loop MIMO scheme is an open-loop diversity scheme that uses rank 1 precoder cycling.

26. The wireless communication device of claim 15, wherein information that identifies the open-loop MIMO scheme is received via radio resource control (RRC) signaling.

27. An apparatus for wireless communication, comprising:
means for applying an open-loop multiple-input multiple-output (MIMO) scheme among a plurality of antenna groups associated with a plurality of antennas when phase coherence cannot be maintained between the plurality of antenna groups, and
wherein the phase coherence results in a constant relative phase difference between at least two antennas of the plurality of antennas; and
means for applying a closed-loop MIMO scheme among antennas within each antenna group of the plurality of antenna groups,
wherein the phase coherence can be maintained between antennas included in each antenna group of the plurality of antenna groups.

28. The apparatus of claim 27, wherein the open-loop MIMO scheme is applied before the closed-loop MIMO scheme is applied.

29. The apparatus of claim 27, wherein the closed-loop MIMO scheme is applied before the open-loop MIMO scheme is applied.

30. A non-transitory computer-readable medium storing instructions for wireless communication, the instructions comprising:
one or more instructions that, when executed by one or more processors of a wireless communication device, cause the one or more processors to:
apply an open-loop multiple-input multiple-output (MIMO) scheme among a plurality of antenna groups associated with a plurality of antennas when phase coherence cannot be maintained between the plurality of antenna groups,
wherein the phase coherence results in a constant relative phase difference between at least two antennas of the plurality of antennas; and
apply a closed-loop MIMO scheme among antennas within each antenna group of the plurality of antenna groups,
wherein the phase coherence can be maintained between antennas included in each antenna group of the plurality of antenna groups.

* * * * *